United States Patent [19]
Husted

[11] Patent Number: 5,245,955
[45] Date of Patent: Sep. 21, 1993

[54] ICE CORE MOLDED ENGINE MANIFOLD

[76] Inventor: Royce H. Husted, 711 Lakeside Dr., Wheaton, Ill. 60187

[21] Appl. No.: 850,568

[22] Filed: Mar. 13, 1992

[51] Int. Cl.$^5$ .......................... B29F 1/022; B29C 1/06
[52] U.S. Cl. .............................. 123/52 MC; 264/271.1
[58] Field of Search ........ 123/52 MV, 52 MC, 52 M; 264/221, 271.1, 259, 317; 428/542.8

[56] References Cited

U.S. PATENT DOCUMENTS

| | | | |
|---|---|---|---|
| 3,892,215 | 7/1975 | Hickling et al. | 123/52 MV |
| 4,743,481 | 5/1988 | Quinlan et al. | 428/36 |
| 4,903,645 | 2/1990 | Borger | 123/52 MC |
| 5,003,933 | 4/1991 | Rush et al. | 123/519 |
| 5,013,515 | 5/1991 | Aoki | 264/513 |
| 5,138,983 | 8/1992 | Daly | 123/52 MC |

FOREIGN PATENT DOCUMENTS

| | | |
|---|---|---|
| 232207A | 8/1987 | European Pat. Off. |
| 59-142118A | 8/1984 | Japan |
| 61-202827A | 9/1986 | Japan |
| 84/00036 | 8/1984 | PCT Int'l Appl. |

Primary Examiner—David A. Okonsky
Attorney, Agent, or Firm—Nicholas A. Camasto

[57] ABSTRACT

A method of injecting molding an intake manifold for an internal combustion engine includes forming a thin-walled hollow shell to match the interior configuration of the manifold, inserting tapered mandrels in the openings of the shell, the mandrels being configured to define grip surfaces thereon, filling the shell with water, freezing the water to form a core assembly with the mandrels secured by the action of the ice gripping the grip surfaces, supporting the core assembly by the mandrels in a mold cavity that defines the outer configuration of the manifold, and injecting flowable, hardenable material in the space between the cavity wall and the core assembly. The manifold and the core assembly are removed and the ice is melted out. The manifold is formed with flanges that have outwardly tapered interiors for ready removal of the complementarily tapered mandrels. The shell has lips that engage and are partially surrounded by the material of the flanges but set back from the mounting surfaces of the flanges. Surface protrusions are formed on the outer surface of the shell to help secure the shell to the wall of the molded manifold.

5 Claims, 4 Drawing Sheets

ICE CORE MOLDED ENGINE MANIFOLD

BACKGROUND OF THE INVENTION AND PRIOR ART

This invention relates generally to injection molding of hollow parts and particularly to injection molding of intake manifolds for internal combustion engines. Blow molding of plastic materials to form hollow, thin-walled objects, such as bottles and other containers is well known in the art. The technique involves expanding a gas or air within a parison of plastic material which is expanded outwardly against mold walls of suitable configuration.

The prior art also teaches the manufacture of hollow plastic articles by forming a hollow shell of appropriate configuration, reinforcing the hollow shell, and supporting the hollow shell on a mandrel within a mold cavity configured to provide a space between the exterior of the hollow shell and the interior of the mold cavity. Reinforcement of the hollow shell is accomplished by filling it with water and freezing it to form ice to withstand the forces of the molding process. The ice is melted and the water removed to complete the hollow molded part. Although the art claims that the hollow part may be injection molded, no commercial use of such a process is known to the inventor.

The techniques disclosed in the prior art may be adequate for the injection molding of small simple parts. The techniques do not appear adequate for injection molding a manifold for an internal combustion engine, as is taught by the method of the invention. As is well known, the manufacturers of both large automotive type engines and of small engines for lawn mowers, tools and the like have been seeking a cost effective way to mold intake manifolds without visible success. Because of the high temperatures encountered with internal combustion engines, the plastic molding material must be of a type that requires both high pressure and high temperature. Also the mold itself needs to be maintained in a heated condition to preclude the injected plastic from cooling too quickly. Various lost-metal processes have been used, but none on a commercial basis. The technique suggested by the art, i.e. using an ice filled thin-walled shell has not led to a commercial product either.

The blow-molded hollow shell is fabricated from a different type of plastic material that may experience difficulty in withstanding the above-mentioned high temperatures and pressures, both in the molding process and in operation as a manifold on an engine. In accordance with the invention, a method of manufacturing a manifold for an internal combustion engine involves providing mandrels with grip surfaces for supporting the preformed thin hollow shell such that the ice in the hollow shell securely holds the mandrels in place. The grip surfaces also lock the mandrels and help to prevent distortion of the hollow shell from the high pressure forces encountered in the injection molding process. The mandrels are positioned in mounting flange locations of the manifold and define outwardly tapered inner surfaces for the flanges, which helps to release the mandrels from the manifold. The tapered surfaces also provide for better flow conditions in the manifold during use. The hollow shell is formed with lips that are embedded in the injection molded flange portions of the manifold. This construction secures the shell from movement due to molding pressures. The lips are also spaced from the mounting surfaces of the flanges to insulate the liner (shell) from the high temperatures encountered both in the mold and in an operating engine. The external surface of the shell or inner liner may also be provided with protrusions for firmly securing the inner liner to the interior wall of the injection molded manifold. The provision and spacing of the lips, which are embedded in the manifold flanges, are important in an engine environment to resist any tendency of the liner to separate from the interior wall of the manifold during operation. Since there is no natural bond between the liner and the manifold wall, after many cycles of operation and temperature changes, buckling and separation could occur. In this connection, the protrusions that firmly anchor the inner liner to the manifold wall also assist in resisting flexing and delamination due to temperature and pressure changes during engine operation.

OBJECTS OF THE INVENTION

A principal object of the invention is to provide a novel method of manufacturing a manifold for internal combustion engines.

Another object of the invention is to provide an improved molded manifold for an internal combustion engine.

A further object of the invention is to provide a low cost injection molded manifold for an internal combustion engine.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
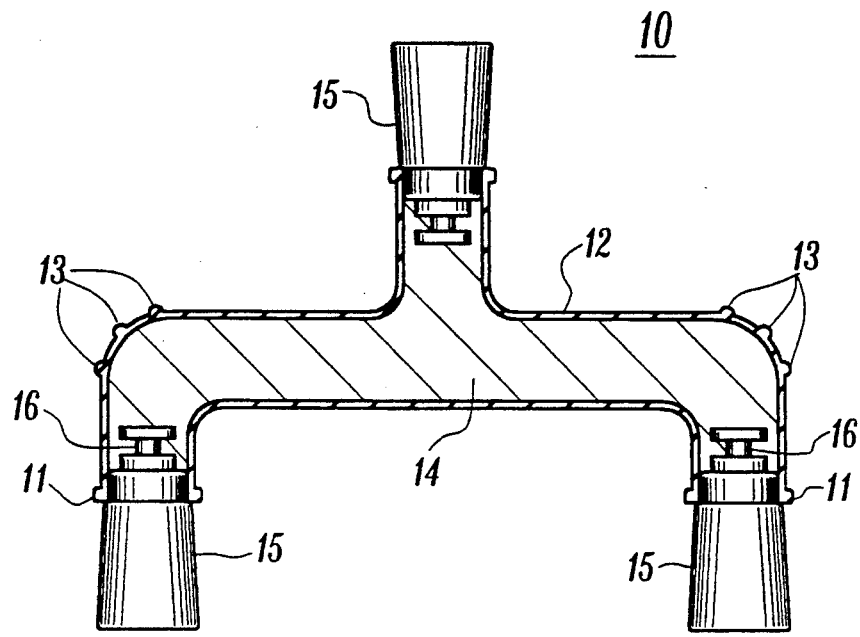
FIG. 1 is the novel engine manifold core assembly of the invention shown in cross section.

Referring to FIG. 1, a core assembly 10 is constructed in accordance with the method of the invention. The core assembly 10 includes a generally cylindrical thin-walled shell 12, that defines the interior configuration of an intake manifold for an internal combustion engine, and three specially shaped mandrels 15 that are secured within shell 12 by solidified water (ice) 14. The thin-walled shell 12 is preferably blow-molded in a suitable mold (not shown). The mold may also include indentations for forming a plurality of protrusions 13, as indicated. Lips 11 are formed in the shell 12 adjacent the areas of the manifold that will constitute mounting flanges. The mounting flanges will contact the engine and the carburetor (neither shown) of the engine. The mandrels 15 are inserted in the openings of shell 12, water is supplied to the interior by any suitable means and the entire arrangement is frozen to form the core assembly 10. As will be seen, the mandrels 15 are securely retained by the solidified water or ice to unify the core assembly. The techniques used in blow molding and trimming the thin hollow shell are well known in the art and not part of the invention.

Figure 2:
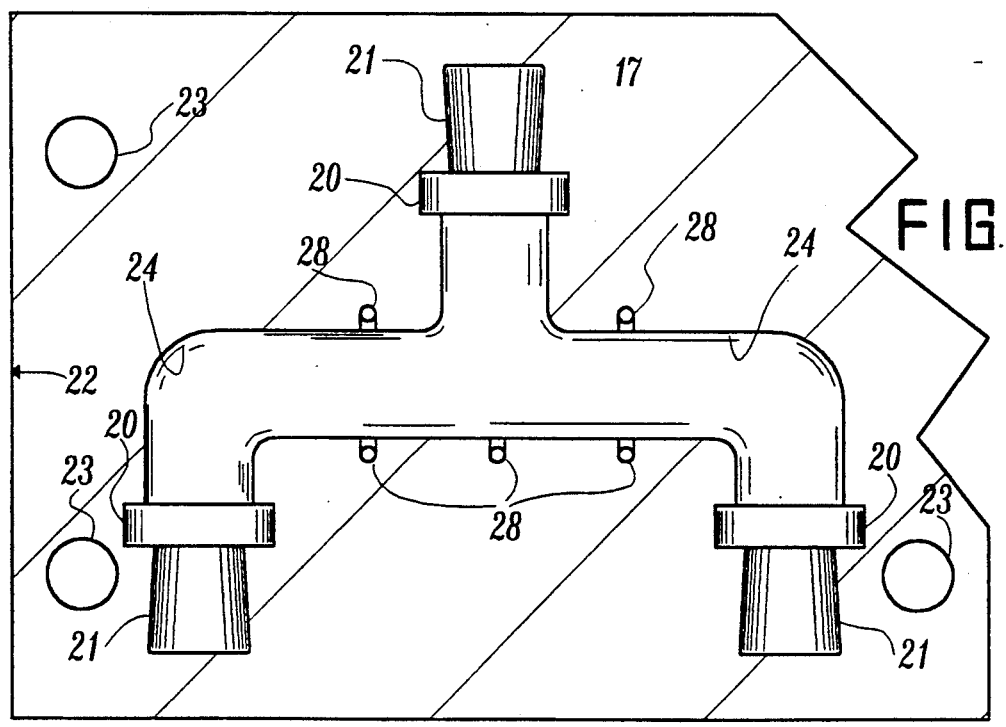
FIG. 2 is a partial view showing one-half of a mold cavity for accepting the core assembly of FIG. 1.

In FIG. 2, one portion of a mold 22 for injection molding an intake manifold 30 (best seen in FIG. 6) around the core assembly 10 is shown. Mold 22 defines a mold cavity 24 which has an inner configuration that matches the outer configuration of the intake manifold 30 which is to be injection molded. Cavity portions 20 define flanges for the manifold and cavity portions 21 define outwardly tapered conical sections for accurately and securely supporting the mandrels 15 so that the core assembly 10 is rigidly maintained in the proper position in the cavity 24. The space between the core assembly 10 and the walls of cavity 24 thus define the walls of the finished intake manifold 30, which will be seamless since the mandrels and ice are removed after molding. The mold may consist of three plates, all of which are aligned by pins 23.

Figure 3:
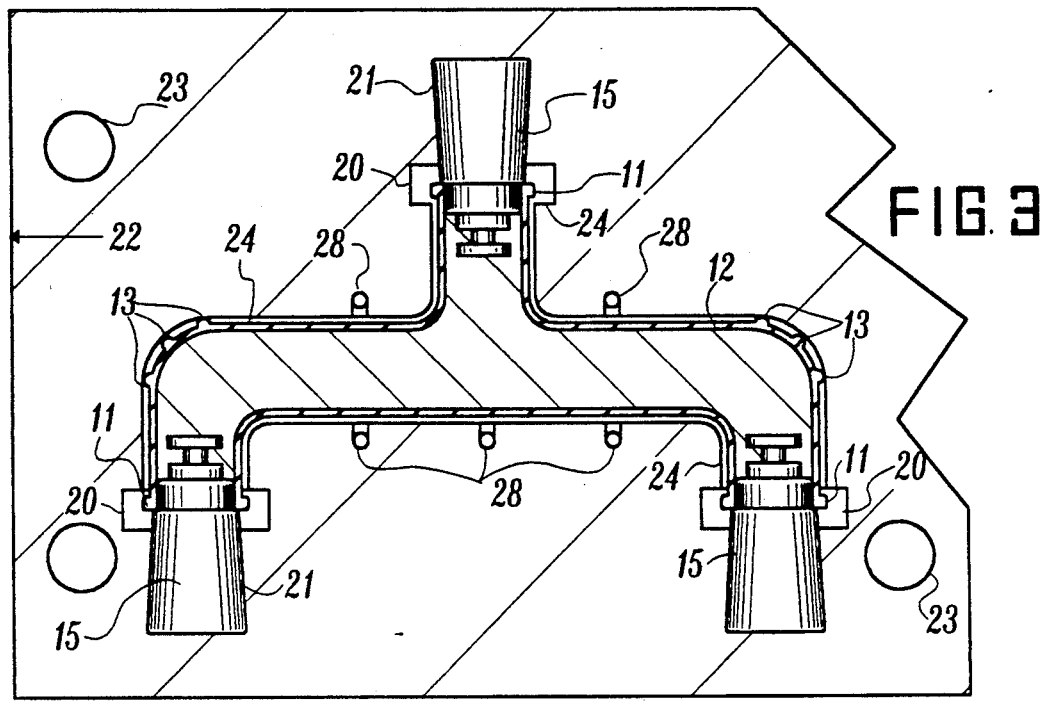
FIG. 3 illustrates the core assembly of FIG. 1 positioned in the mold cavity of FIG. 2.

In FIG. 3, the core assembly 10 is shown in position in the mold 22. It will be appreciated that in FIGS. 3, 4 and 5, the mandrels are not shown in section to better illustrate the construction. It will also be recognized that the molding techniques used herein are well known and are therefore illustrated in a relatively simplistic manner.

The spacing of the lips 11 of shell 12, with respect to the cavity portions 20 in mold 22, which define the flanges of the manifold 30, is important. The lips are securely embedded in the manifold flanges during molding. The protrusions 13 are similarly secured by the interior wall of the manifold. Forming of the manifold is accomplished by injecting a flowable, hardenable plastic material under high pressure into one or more suitable sprues, with the material flowing through gates 28 (only a few of which are shown), into the space between the core assembly 10 and the cavity 24, all in a well known manner. The relatively long and brittle legs of the ice-filled shell 12 must be protected from the very high internal forces that may result from uneven flow of the plastic material during injection. To substantially equalize internal cavity pressure during the injection process, a runner system which distributes the material through opposing pairs of gates is preferably employed. Ideally, many opposing sets of gates such as gates 28 are provided to assure an even flow distribution. To simultaneously inject the plastic material on both sides of the mold cavity, a mold of common three-plate construction is used. Here again, the molding techniques are known in the art.

Figure 4:
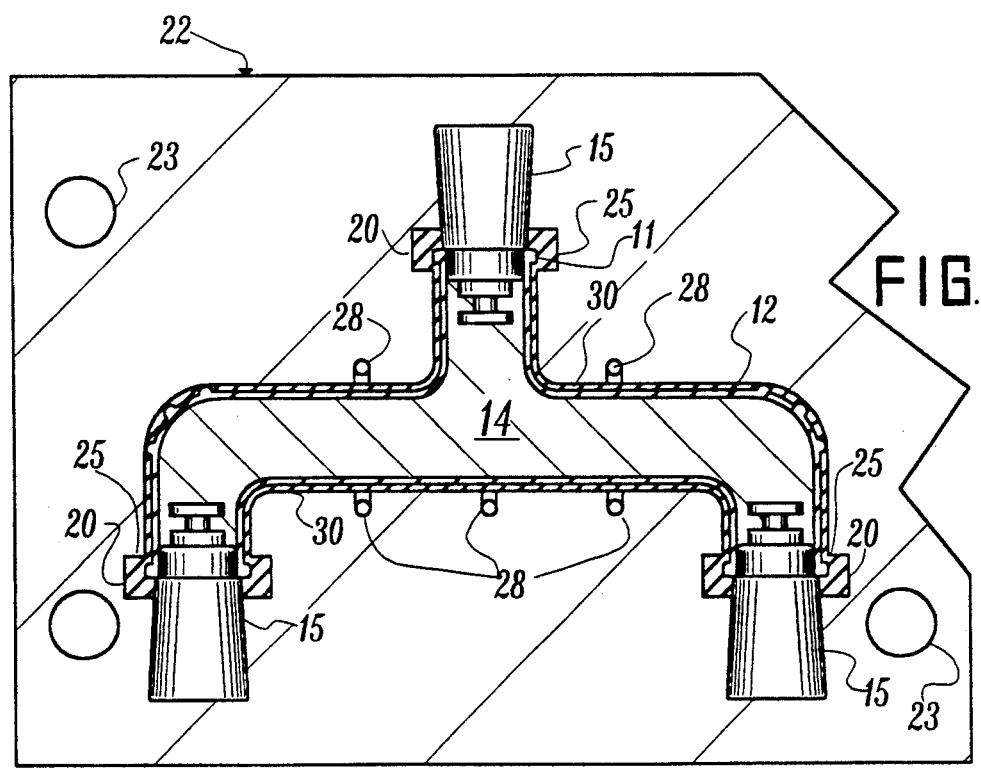
FIG. 4 is a cross section of the injection molded manifold and core assembly in the cavity of FIG. 2.

In FIG. 4, a cross section of the injection molded intake manifold 30 with the core assembly 10 in place in the mold 22 is shown. The thickness and uniformity of the walls of the manifold are readily controlled by well known and conventional injection molding techniques. In the drawings, the thickness of the inner shell or liner 12 is exaggerated for illustrative purposes.

Figure 5:
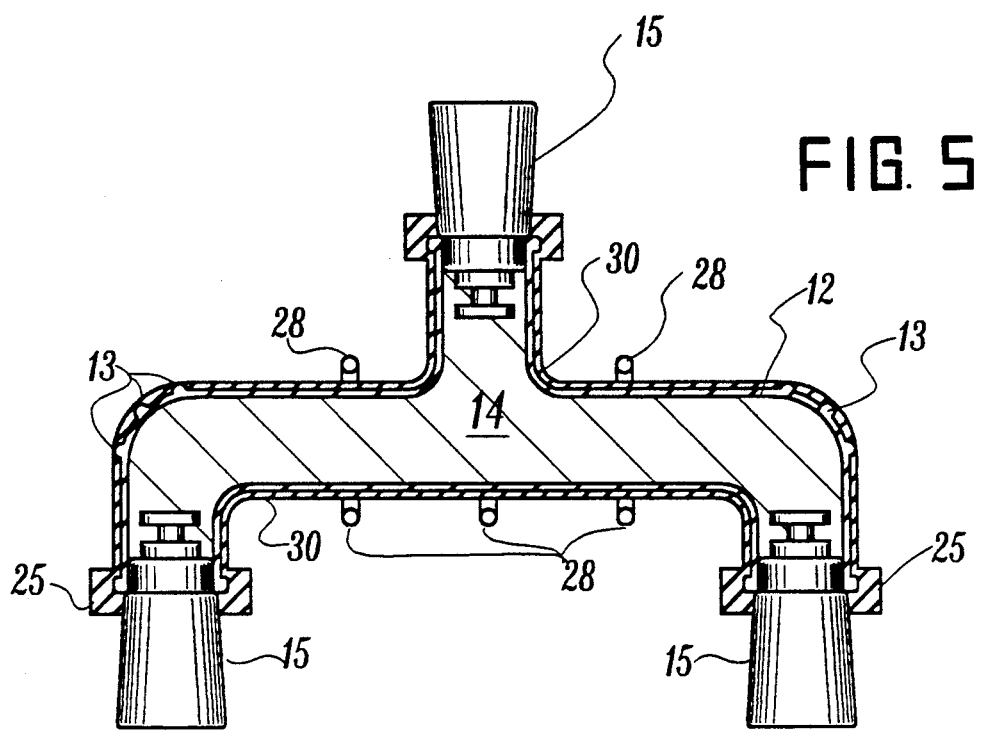
FIG. 5 is a cross section of the manifold and core assembly removed from the mold.
Figure 6:
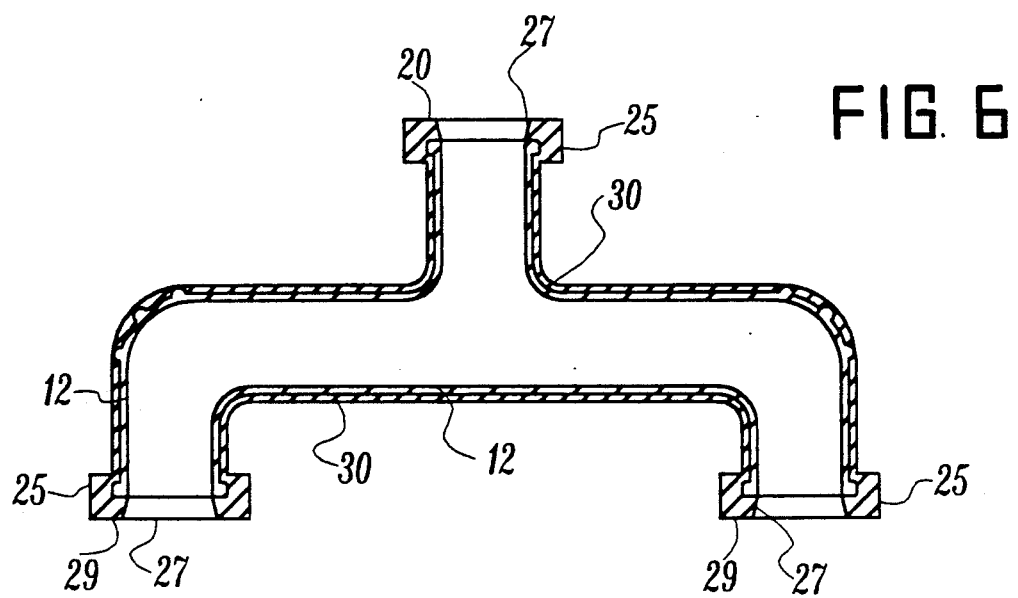
FIG. 6 is a cross section of the completed manifold.

FIG. 5 shows the molded intake manifold 30 with the core assembly 10 still in place, removed from the mold 22. Subsequently the ice is melted, the mandrels are removed and the water allowed to run out. Any plastic flash produced as a result of the mold comprising multiple parts is removed, and the finished manifold, as illustrated in FIG. 6, is produced. The tapered sides of the mandrels 15 form outwardly flared openings 27 in the flanges of intake manifold 30. It will be noted that the thickness of flanges 25 positions the lips 11 of the hollow shell 12 from the manifold mounting surfaces 29. These mounting surfaces 29 engage the body of internal combustion engine and the body of the carburetor (both not shown) and in the case of the engine, preclude the high temperature thereof from adversely affecting the material of liner 12.

Figure 7:
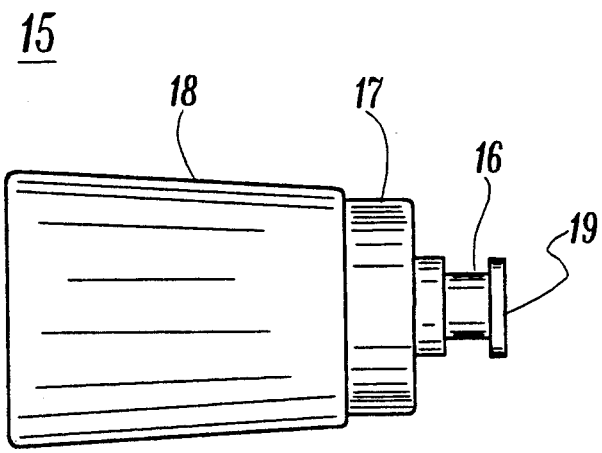
FIG. 7 is a side view of a mandrel constructed in accordance with the invention.
Figure 8:
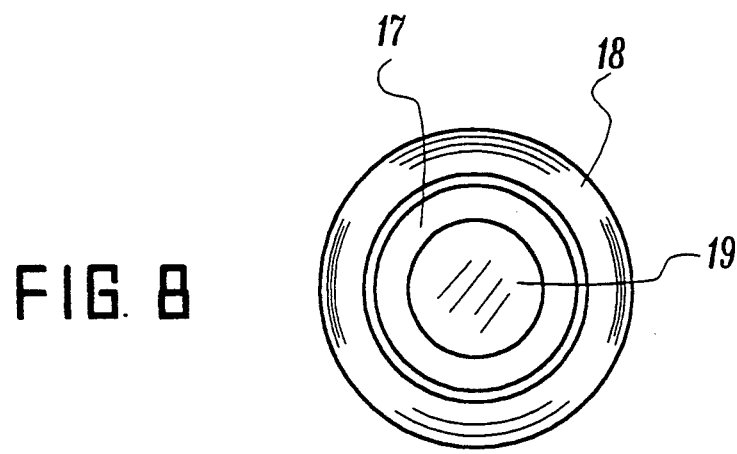
FIG. 8 is an end view of the mandrel of FIG. 7.

In FIGS. 7 and 8, a representative mandrel 15 is illustrated. The mandrel is generally conical in shape and has a tapered surface 18 for providing a draft for easy release of the mandrels from the molded part, i.e. the flanges of the intake manifold 30. A short, generally cylindrical portion 17 snugly engages the inner circumference of the hollow shell 12 and the shoulder between tapered surface 18 and cylindrical portion 17 butts against the lip 11 of the shell 12. Thus the mandrel 15 serves to accurately position the shell 12 within the mold cavity 24. The undercut portion 16 and the table top portion 19 of mandrel 15 cooperate to form a grip surface to enable the mandrel to be firmly held by the ice 14. The grip surface is important to insure adequate support to withstand the forces of the high pressure injection molding process. The shell 12 is especially vulnerable in the process and the mandrels and the gripping effect of the ice are important factors in providing adequate support.

Figure 9:
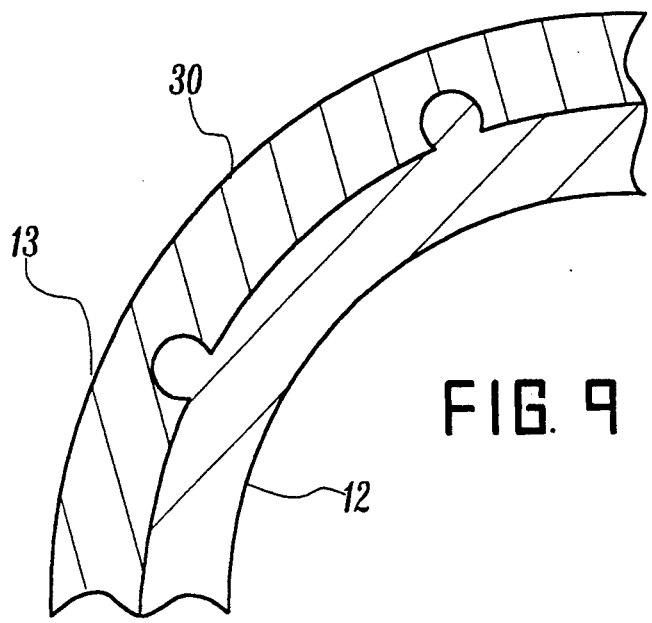
FIG. 9 is a partial sectional view illustrating the protrusions for anchoring the thin shell liner to the inner wall of the manifold.

FIG. 9 illustrates how the protrusions 13, formed on the outer surface of shell 12, secure the shell to the inner wall of manifold 30. These protrusions, as previously indicated, may be formed in the mold for making the blow-molded shell or may be produced after blow-molding by a simple heat staking process to disrupt portions of the outer surface of shell 12. The need for the protrusions and their positions are determined by the shape of the manifold. For example, many "tuned" manifolds are very long, and the repeated temperature cycling during engine operation may require a number of such protrusions 13 to keep the shell securely attached to the interior wall of the manifold. As should be apparent, there is no natural adhesion between the shell and the manifold wall. However, with the lips 11 being embedded in the flanges 25 of the manifold, and with one or more protrusions 13 being embedded in the manifold wall, the manifold is capable of withstanding extreme temperature cycling without delamination. Also, as discussed above, the nature of the plastic material used in the manifold may require that the mold 22 be preheated to a relatively high temperature (200° to 300° F.). At such temperatures, even with an ice filled core assembly, the different plastic of shell 12 may soften, if placed directly in contact with the walls of the mold. The provision of mandrels 15 and the spacing between the mounting surfaces 27 of the flanges 20 and the lips 11 of the shell 12 preclude contact with the cavity walls during the molding process. Also, during operation in an engine, the shell or liner 12 is insulated, by the material of flanges 20, from the hot engine walls.

What has been described is a novel method of manufacturing a manifold for an internal combustion engine as well as a novel injection molded manifold. It is recognized that numerous changes in the described embodiment of the invention will be apparent to those skilled in the art without departing from its true spirit and scope.

The invention is to be limited only as defined in the claims.

What is claimed is:

1. An injection molded high temperature plastic manifold for an internal combustion engine comprising:
    a hollow portion including terminating flanges, defining mounting surfaces; and
    a thin inner liner of lower temperature plastic within said hollow portion and being nested in said terminating flanges and displaced from said mounting surfaces.

2. The manifold of claim 1 wherein said terminating flanges have outwardly flared interiors.

3. The manifold of claim 1 wherein the outer surface of said inner liner has protrusions which are embedded in said hollow portion.

4. A seamless injection molded manifold for an internal combustion engine comprising:
    a hollow cylindrical portion including terminating flanges having outwardly flared interiors and defining mounting surfaces; and
    a thin liner within said cylindrical portion, including lips that are nested in said terminating flanges and displaced from said mounting surfaces.

5. The manifold of claim 4 wherein the outer surface of said inner liner has protrusions that are embedded in said cylindrical portion.

* * * * *